US006622123B1

(12) United States Patent
Chanod et al.

(10) Patent No.: US 6,622,123 B1
(45) Date of Patent: Sep. 16, 2003

(54) INTERACTIVE TRANSLATION SYSTEM AND METHOD

(75) Inventors: Jean-Pierre Chanod, Grenoble (FR); Marc Dymetman, Grenoble (FR)

(73) Assignee: Xerox Corporation, Stamford, CT (US)

( * ) Notice: Subject to any disclaimer, the term of this patent is extended or adjusted under 35 U.S.C. 154(b) by 379 days.

(21) Appl. No.: 09/602,463

(22) Filed: Jun. 23, 2000

(51) Int. Cl.$^7$ ............................................... G10L 21/00
(52) U.S. Cl. ........................... 704/277; 704/2; 704/8; 704/9
(58) Field of Search ................ 704/277, 1, 2, 704/8, 9, 231

(56) References Cited

U.S. PATENT DOCUMENTS

| | | | | |
|---|---|---|---|---|
| 5,426,583 A | * | 6/1995 | Uribe-Echebarria Diaz De Mendibil | 704/2 |
| 5,477,451 A | * | 12/1995 | Brown et al. | 704/2 |
| 5,606,498 A | | 2/1997 | Maruta et al. | |
| 5,991,711 A | | 11/1999 | Seno et al. | 704/3 |
| 6,139,201 A | * | 10/2000 | Carbonell et al. | 704/2 |
| 6,345,243 B1 | * | 2/2002 | Clark | 704/2 |

FOREIGN PATENT DOCUMENTS

| | | | | |
|---|---|---|---|---|
| EP | 0610151 A1 | * | 10/1994 | G06F/15/38 |
| WO | WO 93/22733 | | 11/1993 | |
| WO | WO 95/17729 | | 6/1995 | |

OTHER PUBLICATIONS

Dalrymple, Mary et al. Tools for Morphological Analysis, Center for the Study of Language and Information, Report No. CSLI–87–108, Sep. 1987.
Lyucho User's Guide, Fuji Xerox.
Mel'čuk, Igor A. et al. "A Formal Lexicon in the Meaning–Text Theory (or How to Do Lexica with Words)," Computational Linguistics, vol. 13, Nos. 3–4, Jul.–Dec. 1987, pp. 261–275.
Miller, George A. "WordNet: A Lexical Database for English," Communications of the ACM, vol. 38, No. 11, Nov. 1995, pp. 39–41.
Power, Richard et al. "Multilingual Authoring Using Feedback Texts".
Windi Translation Help Manual, Helios Editions, Belgium.

* cited by examiner

Primary Examiner—Doris H. To
Assistant Examiner—Michael N. Opsasnick
(74) Attorney, Agent, or Firm—Oliff & Berridge, PLC

(57) ABSTRACT

The present invention provides a method and system that utilize a collection of predefined core sentences in a source language, that may be initially accessed through a thematic hierarchy or through key words. New sentences may be recursively elaborated through transformations of a selected core sentence, that comprise substitution and expansion. In accordance With the present invention, the method and system automatically handle syntactic modifications of an interlingual structure, that are implied by a selected transformation. Each transformation establishes a valid new sentence in the source language. The method and system further generate a corresponding translation into any available target language.

23 Claims, 12 Drawing Sheets

INTERACTIVE TRANSLATION SYSTEM AND METHOD

FIELD OF THE INVENTION

The present invention relates to processing of language in a computer system. More particularly, a method and a system for interactively generating a translation of an expression, such as a phrase or sentence, are described. The present invention is applicable in particular to interactive multilingual phrasebooks provided by a computer system, such as a pocket-sized hand-held device or a mobile phone.

BACKGROUND OF THE INVENTION

The automation of language translation has attracted considerable interest over the last decades. This interest is fuelled by a constantly growing demand for translations as the world is growing together not only because of worldwide business activities. A large number of phrasebooks have been printed for assisting, for example, travellers who do not speak the language of a country that they are travelling. Phrases in phrasebooks are generally arranged in a thematic hierarchy with respect to topics, such as "lodging", "eating", "transportation", "sightseeing", "entertainment", for example. The variety of phrasebooks is increasingly enriched by interactive electronic phrasebooks that are embodied as pocket-sized hand-held devices.

U.S. Pat. No. 5,606,498 to Maruta et al discloses a data processing device that translates specific phrases into corresponding phrases in another language or that retrieves specific phrases containing words, comprising a phrase storing unit for storing phrases each consisting of one or more words in a state that label data relating to the phrase is attached to the phrase, a retrieval word input unit for inputting a retrieval word, a label data retrieving unit for retrieving a phrase with the same label data as the retrieval word from among the phrases in the phrase storing unit, a display unit, and a display control unit for controlling an operation of the display unit for displaying the phrase retrieved by the label data retrieving unit.

U.S. Pat. No. 5,787,386 to Kaplan et al discloses a computerized multilingual translation dictionary comprising a set of words and phrases for each of the languages it contains, and a mapping that indicates for each word or phrase in one language what the corresponding translations in the other languages are. The set of words and phrases for each language are divided up among corresponding concept groups based on an abstract pivot language. The words and phrases are encoded as token numbers assigned by a word-number mapper laid out in sequence that can be searched fairly rapidly with a simple linear scan. The complex associations of words and phrases to particular pivot language senses are represented by including a list of pivot-language sense numbers with each word or phrase. The preferred coding of these sense numbers is by means of a bit vector for each word, where each bit corresponds to a particular pivot element in the abstract language, and the bit is ON if the given word is a translation of that pivot element. Then, to determine whether a word in language 1 translates to a word in language 2 requires a bit-wise intersection of their associated bit-vectors. Each word or phrase is prefixed by its bit-vector token number, so the bit-vector tokens do double duty: they also act as separators between the tokens of one phrase and those of another.

U.S. Pat. No. 5,991,711 to Seno et al discloses a language information processing apparatus for translating a model phrase in a first language into a corresponding second language and outputting the translated phrase. The apparatus includes a display that displays the phrase, an input device for inputting a character or a word to be added in the first language to the phrase displayed by the display, a first voice information storage device that stores voice information in the second language corresponding to the phrase, and a second voice information storage device that prepares and stores voice information concerning the character or word in the first language with an intonation in the first language, which character or word is input by the input device. The apparatus further includes a translation instruction device for instructing the translation of the phrase containing the character or the word in the first language, which character or word has been added by the input device, and a voice information reading device that reads the voice information in the second language corresponding to the phrase from the first voice information storage device under instruction from the translation instruction device, and reads the added character or word in the first language from the second voice information storage device.

Although considerable progress has been made, numerous problems remain to be solved not only because of complexity of human language.

SUMMARY OF THE INVENTION

The present invention has been made in consideration of the above situation, and it is the primary object of the present invention to provide an improved method and an improved system that enable a user to build a variety of useful sentences in a language that the user has no knowledge of.

It is another object of the present invention to provide a method and a system that enable the user to build a considerable number of sentences from a limited stock of source sentences.

It is still another object of the present invention to provide a method and a system that implement an interactive multilingual phrasebook that guides the user through the process of generating a desired expression in a selected target language.

It is still another object of the present invention to provide a method and a system that enable the user to monitor the process of generating the expression in the target language in the user's own language.

It is yet another object of the present invention to provide a multilingual phrasebook that combines the conventional way of using a phrasebook with an interactive way of using the phrasebook.

These and other objects of the present invention will become apparent hereinafter.

To achieve these objects, the present invention provides a method and system that utilize a collection of predefined core sentences in a source language, that may be initially accessed through a thematic hierarchy or through a key word. New sentences may be recursively elaborated through transformations of a selected core sentence, that comprise substitution and expansion. In accordance with the present invention, the method and system automatically handle syntactic modifications of an interlingual structure, that are implied by a selected transformation. Each transformation establishes a valid new sentence in the source language. The method and system further generate a corresponding translation into any available target language.

The method and system may be implemented on a variety of data processing systems, thus, substituting prior-art electronic phrasebooks, and propelling novel interactive multilingual phrasebooks.

In a preferred embodiment, the present invention provides an interactive method of generating an expression in a target language, wherein said method comprises providing a source expression in a source language, said source expression comprising at least one item and having a corresponding interlingual representation; outputting said source expression to a user; in response to receiving a transformation instruction from said user, transforming said source expression in accordance with said transformation instruction, and outputting said transformed source expression to said user; generating a corresponding interlingual representation to said transformed source expression; generating, from said corresponding interlingual representation of said transformed source expression, a target expression in said target language; and outputting said target expression.

The preferred embodiment provides a method in accordance with one aspect wherein said method comprises, in response to receiving a selection instruction from said user, selecting an item in said source expression.

In another aspect, the preferred embodiment provides a method wherein said item is selected in response to said user clicking on said item.

In yet another aspect, the preferred embodiment provides a method wherein said step of transforming comprises substituting said selected item with a substitution; or expanding said selected item with an expansion.

Furthermore, the preferred embodiment provides a method in accordance with another aspect wherein said method comprises providing a list of substitutions or expansions; and, in response to receiving a list selection from said user, selecting said substitution or expansion from said list.

The preferred embodiment also provides a method in accordance with still another aspect wherein said method comprises, in response to receiving a repetition instruction from said user, repeating said steps of transforming and outputting said transformed source expression.

In two further aspects, the preferred embodiment provides a method wherein said steps of outputting an expression comprise displaying the expression, and a method wherein said steps of outputting an expression comprise reading the expression.

The preferred embodiment provides a method in accordance with another aspect wherein said method comprises providing a plurality of languages; and, in response to receiving a language selection from said user, selecting said target language from said plurality of languages.

The preferred embodiment provides a method in accordance with yet another aspect wherein said method comprises providing a plurality of source expressions in said source language.

The preferred embodiment also provides a method in accordance with still another aspect wherein said method comprises, in response to receiving a key item from said user, generating, from said plurality of source expressions, a list of source expressions related to said key item; outputting said list of source expressions; and, in response to receiving an expression selection from said user, selecting, from said list of source expressions, said source expression to be provided.

Furthermore, the preferred embodiment provides a method in accordance with another aspect wherein said method comprises arranging said plurality of source expressions into a thematic hierarchy; outputting said plurality of source expressions in accordance with said thematic hierarchy; and, in response to receiving an expression selection from said user, selecting, from said plurality of source expressions, said source expression to be provided.

The preferred embodiment also provides a method in accordance with still another aspect wherein said method comprises associating at least one instruction with an iconic representation; and displaying said iconic representation.

Furthermore, the preferred embodiment of the present invention provides a computer program product, for use in a computer system, having computer-executable instructions adapted to enable said computer system to perform a method in accordance with any of the above-described aspects.

In the preferred embodiment, the present invention further provides a system, for use in a computer system, for interactively generating an expression in a target language, wherein said system comprises means for providing a source expression in a source language, said source expression comprising at least one item and having a corresponding interlingual representation; means for outputting said source expression to a user; means for, in response to receiving a transformation instruction from said user, transforming said source expression in accordance with said transformation instruction, and outputting said transformed source expression to said user; means for generating a corresponding interlingual representation to said transformed source expression; means for generating, from said corresponding interlingual representation of said transformed source expression, a target expression in said target language; and means for outputting said target expression.

The preferred embodiment provides a system in accordance with one aspect wherein said system comprises means for, in response to receiving a selection instruction from said user, selecting an item in said source expression.

In another aspect, the preferred embodiment provides a system wherein said item is selected in response to said user clicking on said item.

In yet another aspect, the preferred embodiment provides a system wherein said means for transforming comprises means for substituting said selected item with a substitution; or means for expanding said selected item with an expansion.

Furthermore, the preferred embodiment provides a system in accordance with another aspect wherein said system further comprises means for providing a list of substitutions or expansions; and means for, in response to receiving a list selection from said user, selecting said substitution or expansion from said list.

The preferred embodiment also provides a system in accordance with still another aspect wherein said system comprises means for, in response to receiving a repetition instruction from said user, causing said means for transforming and outputting said transformed source expression to repeat said transforming and outputting, respectively.

In two further aspects, the preferred embodiment provides a system wherein said means for outputting an expression comprise means for displaying the expression, and a system wherein said means for outputting an expression comprise means for reading the expression.

The preferred embodiment provides a system in accordance with another aspect wherein said system further comprises means for providing a plurality of languages; and means for, in response to receiving, a language selection from said user, selecting said target language from said plurality of languages.

The preferred embodiment provides a system in accordance with yet another aspect wherein said system comprises means for providing a plurality of source expressions in said source language.

The preferred embodiment also provides a system in accordance with still another aspect wherein said system comprises means for, in response to receiving a key item from said user, generating, from said plurality of source expressions, a list of source expressions related to said key item; means for outputting said list of source expressions; and means for, in response to receiving an expression selection from said user, selecting, from said list of source expressions, said source expression to be provided.

Furthermore, the preferred embodiment provides a system in accordance with another aspect wherein said system comprises means for arranging said plurality of source expressions into a thematic hierarchy; means for outputting said plurality of source expressions in accordance with said thematic hierarchy; and means for, in response to receiving an expression selection from said user, selecting, from said plurality of source expressions, said source expression to be provided.

The preferred embodiment also provides a system in accordance with still another aspect wherein said system comprises means for associating at least one instruction with an iconic representation; and means for displaying said iconic representation.

Furthermore, the preferred embodiment of the present invention provides a system that is comprised in a pocket-sized hand-held device.

As those skilled in the art will appreciate, an aspect or aspects of a particular embodiment may be combined with an aspect or aspects of another embodiment.

BRIEF DESCRIPTION OF THE DRAWINGS

The accompanying drawings are incorporated into and form a part of the specification to illustrate several examples of the present invention. These drawings together with the description serve to explain the principles of the present invention. The drawings are only for the purpose of illustrating preferred and alternative examples of how the present invention can be made and used and are not to be construed as limiting the present inventions to only the illustrated and described examples. Further features and advantages will become apparent from the following and more particular description of the various embodiments of the present invention, as illustrated in the accompanying drawings wherein.

DETAILED DESCRIPTION OF THE INVENTION

The illustrative embodiments of the present invention will be described with reference to the drawings.

Figure 2:
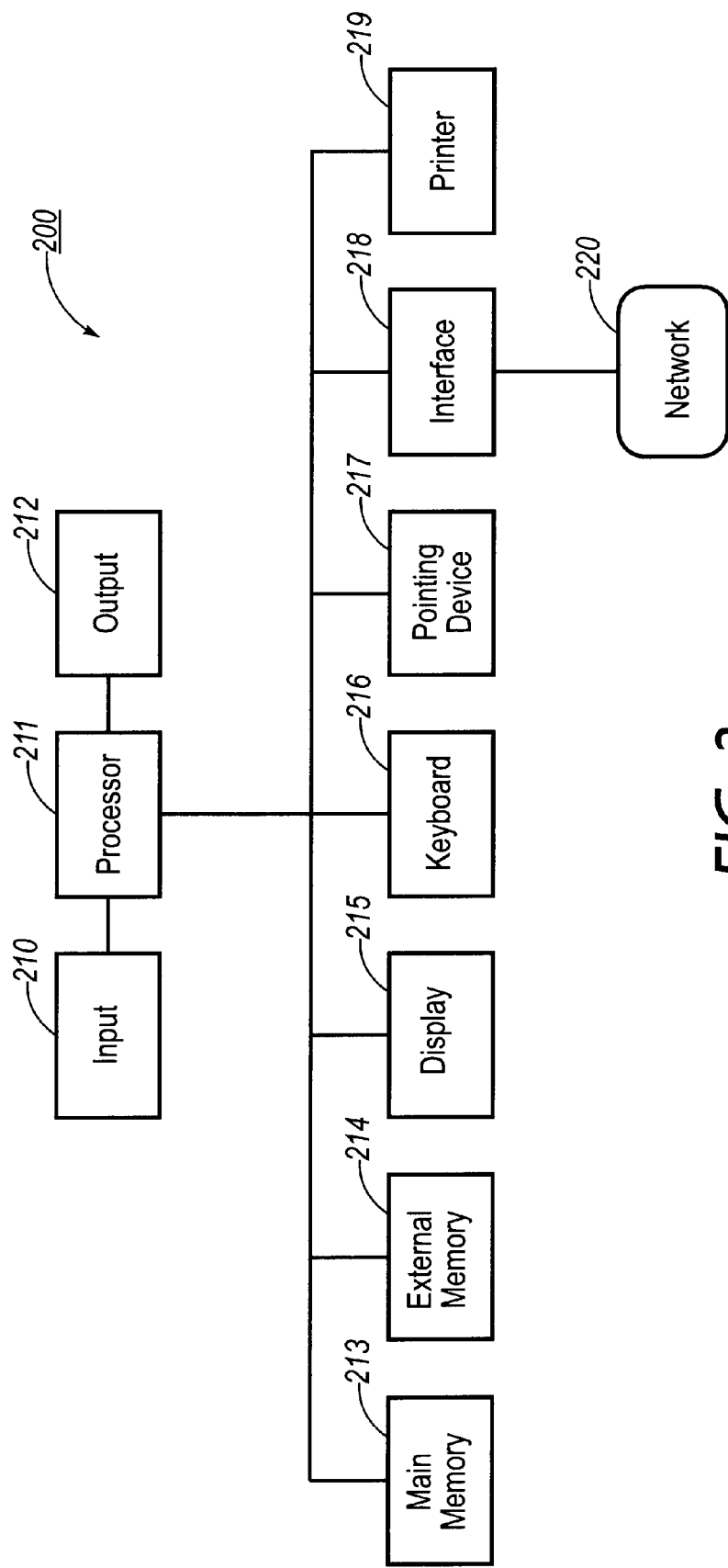
FIG. 2 illustrates a schematic diagram of the computer system according to the present invention.

As illustrated in FIG. 2, the computer system 200 according to the present invention comprises an input 210 for receiving user input, a processor 211 connected to the input 210 for performing the inventive method of interactively generating a target expression, such as a phrase or sentence, in a target language, and an output 212 connected to the processor 211 for outputting the generated target expression.

The computer system 200 generates, starting from a source expression in a source language, the target expression in the target language through interactively controlled iterations. The user may monitor the generation of the target expression in a preferred language, i. e. the user's own language, and the computer system 200 automatically performs syntactic modifications that are implied by transformations selected by the user through the input 210. The source expression may be taken from a phrasebook provided by the computer system 200. The phrasebook may comprise a plurality of source expressions, and the source expression may be selected by the user from a list of source expressions, that is arranged in accordance with a thematic hierarchy, or that is generated with respect to a key item, such as a key word or head word, supplied by the user via the input 210.

Consequently, the input 210 comprises means for receiving user input, such as instructions, selections, key items, and items, such as a name, to be added to the source expression. The input 210 may comprise a keyboard 216, pointing device 217, such as a computer mouse, or the like. For spoken user input, the input 210 may comprise an audio transducer, such a microphone, and an analog-to-digital converter (ADC) for converting an analog signal produced by the transducer into digital data.

The output 212 comprises means for outputting the source expression, the target expression and guidance to the user. The output 212 may comprise a display 215, printer 219, or the like. For spoken output, the output 212 may comprise a digital-to-analog converter (DAC) for converting digital data into an analog signal, an amplifier for amplifying the analog signal, and an output transducer, such as a speaker or headphone, for outputting an acoustic signal. However, the target expression may also be stored onto a computer-readable medium or sent via a computer or telephone network 220. While the source language and the target language are usually languages understood by humans, such as English, French and German, the second language may also be a computer-compatible language for embodiments of the present invention wherein the present invention is utilized for a human-machine interface.

As those skilled in the art will appreciate, the computer system 200 preferably comprises main memory 213 for storing program code, such as an operating system and application programs, and data, such as a representations of source expressions, target expressions and interlingual structures. The computer system 200 preferably further comprises external memory 214, such as a hard-disk drive and floppy-disk drive, for storing the program code and data more permanently. The computer 200 may further comprise a display 215, such as a liquid crystal display (LCD), a keyboard 216 and a pointing device 217, such as a computer mouse, for interaction with a user. The user interaction is required for interactive operation of the computer system 200, and may also be utilized for the output 212 and the input 210, respectively. The computer system 200 may also comprise an interface 218 for connecting the computer system 200 to a network 220, such as a local area network (LAN), the Internet or a telephone network that may be wireless. The computer system 200 may further comprise a printer 219, such as an ink printer, laser printer, or impact printer including devices for outputting Braille.

Figure 3:
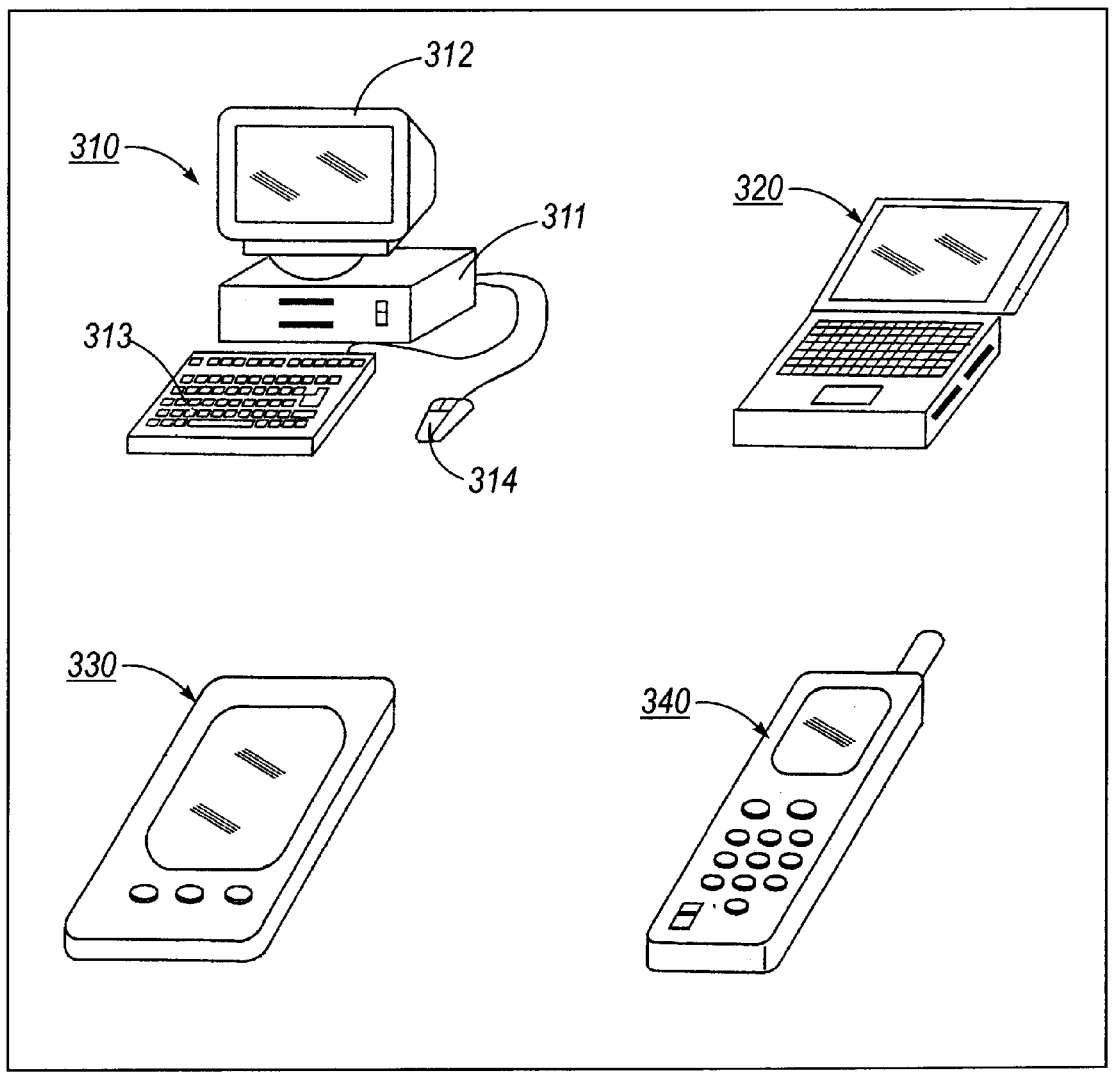
FIG. 3 illustrates a selection of embodiments of the computer system according to the present invention.

FIG. 3 illustrates a selection of computer systems 310, 320, 330 and 340 that may be utilized for performing the inventive method. The inventive method may be performed on a computer system 310 resembling a conventional desktop computer or workstation comprising a main unit 311, a display 312, a keyboard 313 and a computer mouse 314. Alternatively, the computer system may resemble a laptop computer 320, notebook computer, palmtop computer, multilingual electronic phrasebook, or the like. The computer system may also resemble a hand-held personal digital assistant (PDA) 330 that combines computing, telephone, telefax and networking features. However, the computer system may also be implemented into other electronic devices, such as a mobile phone 340. The user could, during a conversation with an interlocutor, activate the mobile phone 340 to generate interactively a target expression in the interlocutor's language and transmit the generated target expression to the interlocutor.

As those skilled in the art will appreciate, the application of the method and the system according to the present invention is not limited to the selection of computer systems illustrated in FIG. 3.

The interactive multilingual phrasebook according to the present invention comprises a collection of sample sentences. These sentences may be arranged in a thematic hierarchy with respect to a plurality of topics. The user may browse through the collection of sample sentences based on the thematic hierarchy that has a predefined tree-like structure. At a top level, the thematic hierarchy may offer topics, such as "lodging", "eating", "transportation", "sightseeing" and "entertainment". The topic "eating" may comprise a subtopic "restaurant" that may comprise a subtopic "ordering food" that in turn may comprise a subtopic "special needs". Additionally, or alternatively, the user may search the phrasebook for a sample sentence using a key word that may be entered into the system, or selected from a list of key words presented to the user. Upon receiving a key word from the user, the system searches the phrasebook for corresponding sample sentences, and presents sample sentences that correspond with the key word to the user.

In accordance with the present invention, the sample sentence may be utilized as a source sentence for interactively generating a target sentence in a target language. The present invention allows the user to use the phrasebook for deriving new sentences from the sample sentence through interactive and recursive transformations that include substitutions and expansions. The phrasebook provides an interlingual representation of each and every sample sentence. As a consequence, the system may modify the interlingual representation of the source sentence in accordance with the substitution or expansion to be applied in any particular iteration. Thus, the system may generate transformed sentences in the source language, i. e. the user's language, as well as one or more target languages. Therefore, the system does not only provide a translation into the target language, but also means that enable the user to monitor and control the effects of each and every transformation in the user's preferred language.

As the system generally provides a list of available substitutions or expansions for a selected item, i. e. a word, in the sample sentence, the system can modify the corresponding interlingual representation in accordance with the transformation to be performed. In other words, since the system offers a limited number of modifications for a selected item during any particular iteration, it can be assured that the interlingual representation can be correctly modified. Substitution and expansion may be referred to as elementary transformations.

In more detail, for a selected item in the source sentence, the system provides a list of possible substitutions for this item in order to modify the source sentence along a paradigmatic axis. The list of possible substitutions is either predefined or restricted. A predefined list of possible substitutions comprises a plurality of predetermined items. A restricted list of possible substitutions is limited by constraints that are defined in the semantic scheme associated with the selected item. Assuming the source sentence "I would like to order a steak", and that the item "steak" has been selected, the possible substitutions belong to the paradigm of eatable objects, i. e. food.

Alternatively, for a selected item in the source sentence, the system provides a list of possible expansions for this item in order to modify the source sentence along a syntagmatic axis. The list is either predefined or restricted. The predefined list of possible expansions comprises, for example, common semantic operators such as negation, past/future/conditional, modality, politeness. The restricted list of possible expansions is limited by constraints defined in the semantic scheme associated with the selected item. Assuming the source sentence "I would like to reserve a room", and that the item "room" has been selected, the restricted list may comprise possible expansions such as "quiet", "sunny", "with a shower", and "with a view of the park".

In the preferred embodiment of the present invention, the interactive translation system comprises a plurality of linguistic resources.

A semantic lexicon for expressing domain vocabulary by means of an interlingual concept is provided. The semantic lexicon is constituted of a set of unambiguous and language-neutral symbols.

A morphological lexicon for analyzing and generating language-specific morphological forms associated with a given interlingual concept is provided for each language. The morphological forms comprise, for example, tensed verbs and plural nouns.

A plurality of local semantic schemes for combining interlingual concepts into meaningful patterns relative to the domain considered is provided.

A set of rules for converting local semantic schemes into syntactically well-formed structures relative to the language is provided for each language. In the preferred embodiment, these syntactic rules are constrained to be of a simple form. The syntactic rules may be essentially limited to combining surface material through concatenation or slight extensions of concatenation.

Further, a multiple-inheritance hierarchy of paradigms is provided. The hierarchy is constituted of named subsets of interlingual lexemes that possess a high level of interchangeability in a given context. The paradigms may include, for example, "drink", "color" and "time-localizer". The local semantic schemes may refer to these paradigms.

A plurality of "salient" semantic schemes that correspond with high-frequency utterances, may be provided. These "salient" semantic schemes may be evaluated in order to prioritize items in lists of items that are presented to the user for selection.

An important principle of the present invention and the phrasebook according to the present invention is the interactive multilingual generation. The preferred embodiment provides a user-friendly interface that guides the user through the generation using the source language, i. e. the user's own language, and allows the user to control the generation by modifying items of the source sentence that is displayed in the source language by selecting items within the source sentence, and substituting and expanding selected items with items from system-provided or system-generated lists. In the preferred embodiment, the user may further provide substitutions and expansions for selected items through the input, and "train" the system by defining new substitutions and expansions and store them within the system. In principle, any available language may function as source language or target language.

Operation of the interactive translation system and method is organized around an interlingual structure. The interlingual structure is a language-neutral dependency-like tree-structure reflecting the semantic make-up of any expression in the phrasebook.

The interactive translation system and method manipulate the interlingual structures with respect to certain well-formedness conditions. The well-formedness conditions guarantee that valid target sentences may be unambiguously generated in each target language.

In the preferred embodiment, the interactive translation system and method generate the source sentence in the source language from a corresponding interlingual structure. The sentence is output to the user, and the user is allowed, under control of the interlingual structure, to perform certain valid substitutions and expansions on words in the source sentence. Any modifications may be transparently reflected to the user as changes in the source sentence. In the preferred embodiment, the system and method may simultaneously generate the corresponding target sentence in a selected target language. Alternatively, the target sentence may be generated in response to a translation instruction input to the system. The system and method may further comprise an undo function that reverses one or more modifications in case that the user dismisses the one or more modifications.

Figure 4:
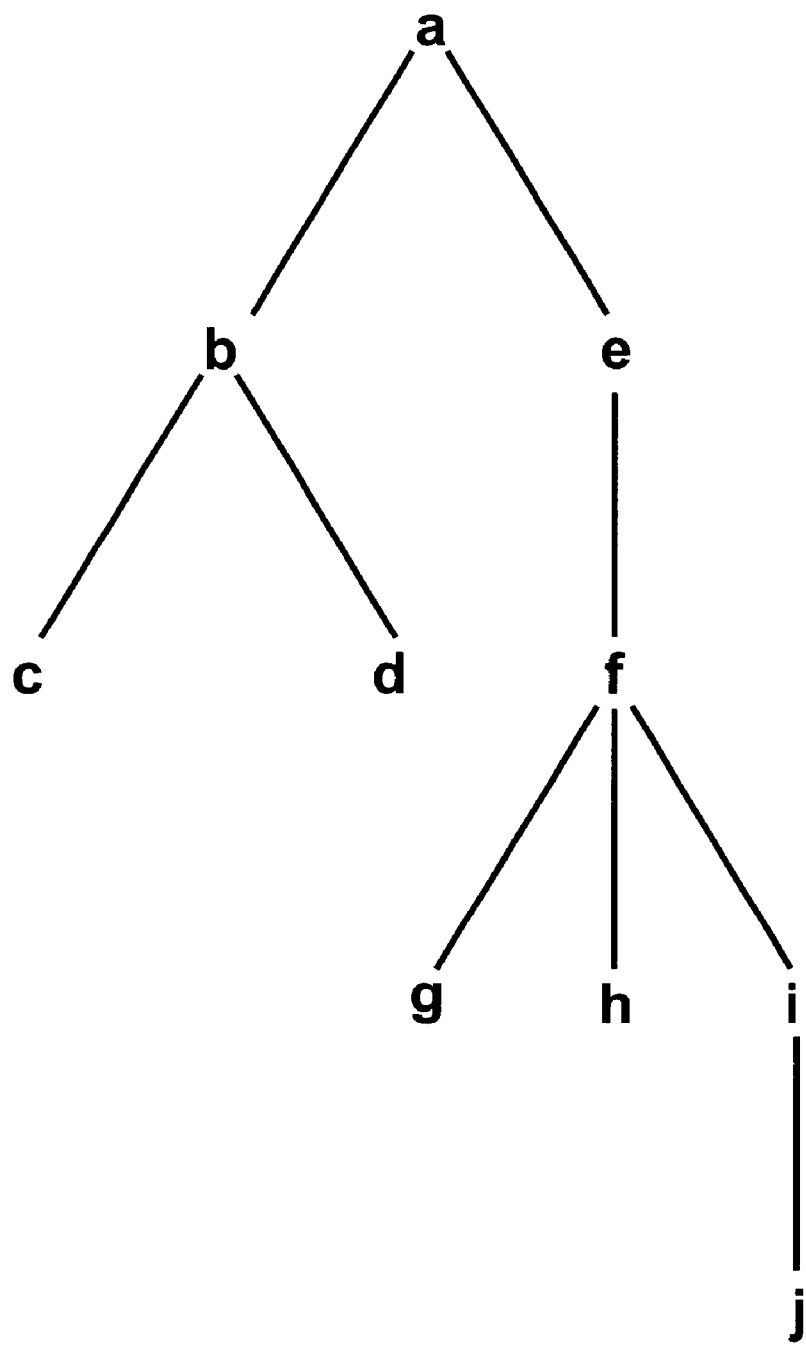
FIG. 4 illustrates a tree-like interlingual structure.
Figure 5:
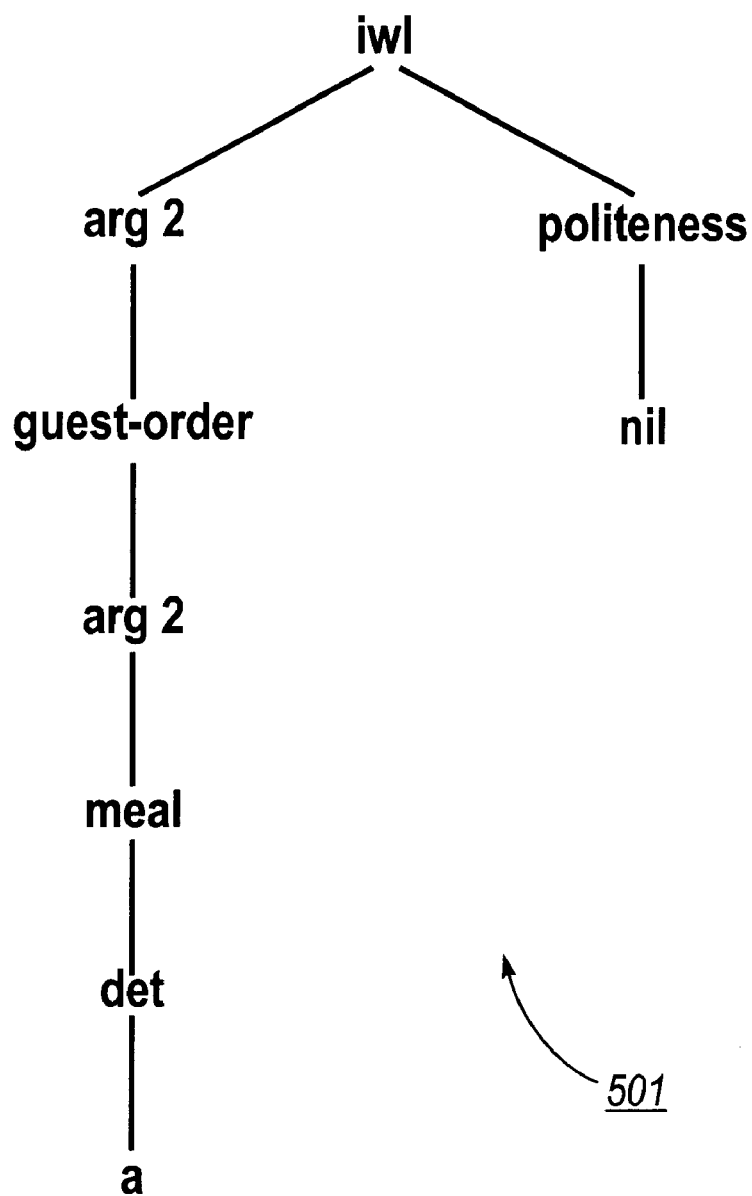
FIGS. 5 to 12 illustrate transformation of the interlingual structure of a particular example.
Figure 6:
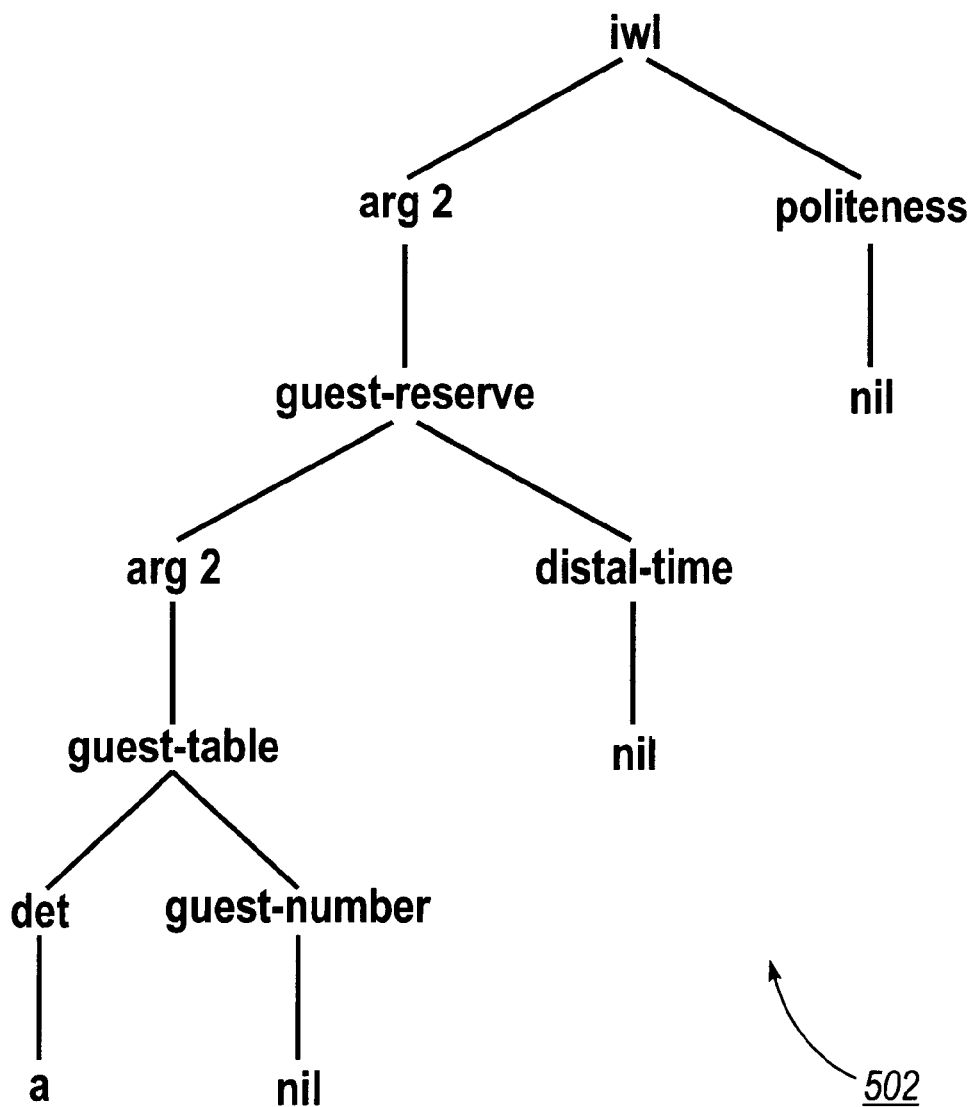
Figure 7:
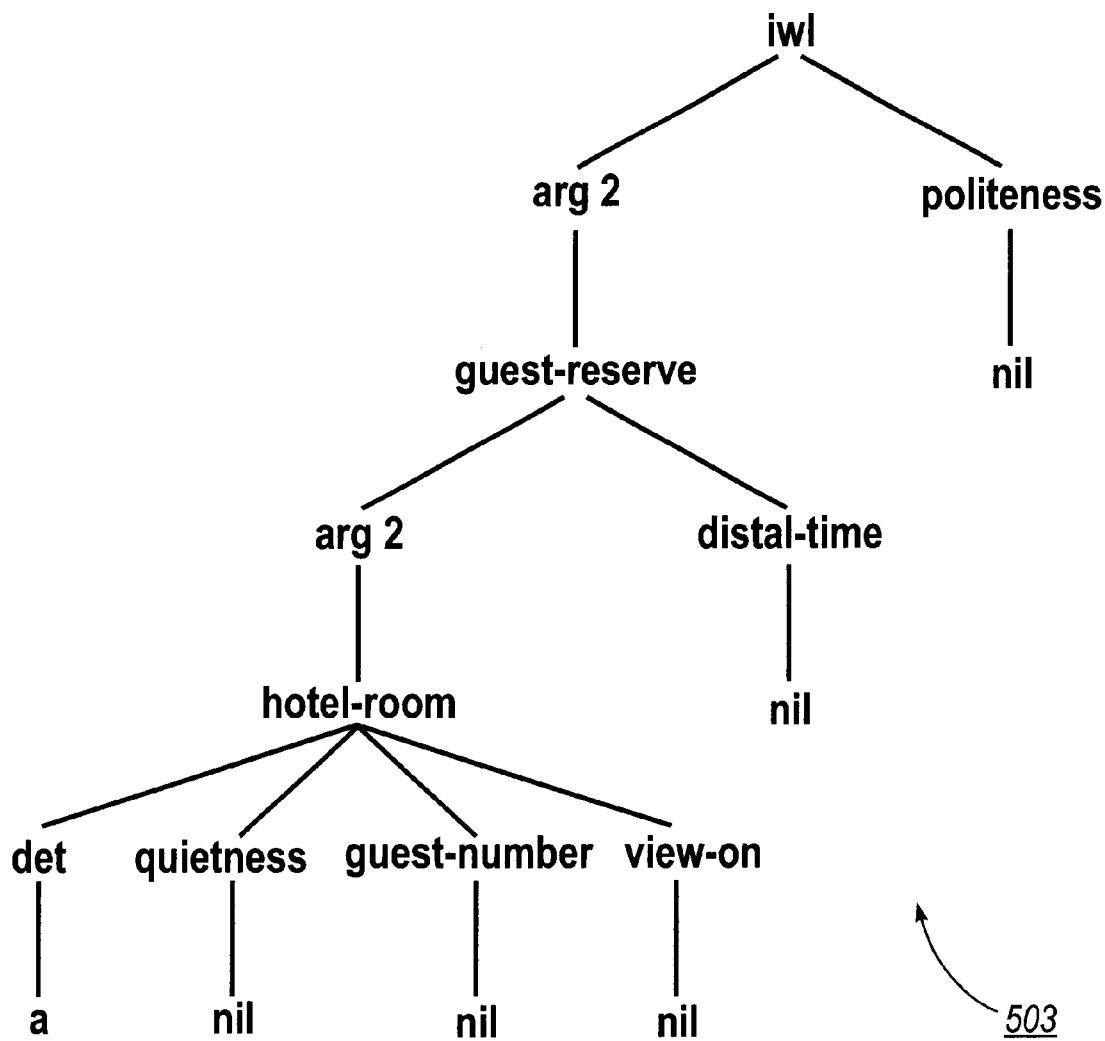

Interlingual structures may be implemented as trees. FIG. 4 illustrates a tree-like interlingual structure. As shown in FIG. 4, a root node a, that has no parent node, has child nodes, i. e. children, b and e. Node b has child nodes c and d that are both leaf nodes, that have no child nodes. Node e has a single child node f that has child nodes g, h and i. Nodes g and h are leaf nodes, and node i has a child node j that is a leaf node. In other words, tree a(b(c,d),e(f(g,h,i (j)))) is constituted of elementary subtrees a(b,e), b(c,d), e(f), f(g,h,i) and i(j). The tree is a valid interlingual structure in case that its elementary subtrees are valid local semantic schemes. The nodes of the interlingual structure are interlingual lexemes, and leaves may also be an "empty" lexeme nil.

The semantic scheme S is associated with each interlingual lexeme x; the semantic scheme S is a full representation of the scheme associated with interlingual lexeme x. Further, a default representation S' is associated with the semantic scheme S, that corresponds with the semantic scheme S with all optional children replaced by nil.

For a substitution, the user implicitly selects a node in the tree and selects a replacement x for this node from a plurality of lexemes, such that the elementary subtree immediately above x remains a valid semantic scheme, and, therefore, the whole interlingual structure is valid. The default representation for the semantic scheme for x simultaneously replaces x in the tree.

For an expansion the user implicitly selects an internal node x in the tree as well as one of its optional children that has the current default value nil, and replaces the default value with the lexical value it has in the full representation of the scheme associated with x.

In the preferred embodiment of the present invention, the user initiates transformations, i. e. substitutions and expansions, by selecting a word in the source sentence, that is specially marked as allowing substitution or expansion. The user may select the word by moving a cursor through the source sentence to the word and clicking on the word using a pointing device, such as a computer mouse or cursor keys.

For a substitution, a list of words, i. e. source renderings for interlingual lexemes in paradigmatic relation to the activated lexeme, is displayed. The user may select an adequate substitute from the list. Once the selection has been made, the selected substitution is inserted into the source sentence, with its default complementation, in a way that respects the syntax of the source language.

For an expansion, the user selects an expandable word in the source sentence, and the system outputs a list of words, i. e. source language renderings for the interlingual lexemes in syntagmatic relation to the activated lexeme that can replace nil leaves in the default representation of the local scheme rooted by the activated lexeme, and the user may select a desired expansion. In the preferred embodiment, the interactive translation system and method provide a simplified user interface for some optional children representing, for example, negation, modality, tense and plurality. The available expansions may be displayed in some iconic form, such that the user may, in order to select an expansion, select a corresponding icon, check a corresponding check box, touch a corresponding button being displayed, or depress a key corresponding with the expansion when the expansion is available.

In the preferred embodiment, the system and method according to the present invention display a list of substitutions or a list of expansions in a pop-up window that may at least partially mask the source sentence in order to provide a compact display. However, as those skilled in the art will appreciate, the available display may be partitioned into a number of sections, one for displaying the source sentence, one for displaying the target sentence, one for displaying the list of substitutions or the list of expansions, and one for providing user guidance and help, for example.

The mechanism of generating the source sentence for display and the target sentence corresponding to each state of the developing interlingual structure is restricted in order to simplify the translation process. The mechanism is basically a bottom-up process of concatenating strings associated with each subtree according to a small number of language-specific syntactic rules. These syntactic rules depend only on the content of the local semantic trees. Thus, in the preferred embodiment of the present invention, the mechanism performs a "string composition" over a semantic structure, however, in an alternative embodiment, the mechanism could perform a "semantic composition" of formal grammars over syntactic structures. Owing to particularities of language, the strict string concatenation would be too restrictive to account for even the simplest agreement or elision phenomena, therefore, an extension to the basic mechanism is advantageous.

Instead of supposing that each subtree is associated with a single string for a given language, in the preferred embodiment, a finite set of interface/string pairs is associated, at least conceptually, with each subtree. The identifier "interface" defines a language-dependent interface feature, such as number, gender, person; the interface features constitute a small list of interface features. The value "string" is a variant of a single underlying string satisfying the interface structure that ensures a compact representation of the subtrees. In the preferred embodiment, the mechanism concatenates the strings according to the local syntactic rules, whereby the interface features may be inspected in order to guarantee compatibility. While the mechanism employs the interface structure on a conceptual level, the set of interface/string pairs does not have to be stored in a memory, but the morphological component is evaluated on the fly for generating an adequate string variant.

The method according to the present invention may be readily implemented into a computer program. Although the method will be described with reference to the preferred embodiment, those skilled in the art will appreciate that the method may be implemented to the same effect using a variety of concepts and approaches to software programming, including object-oriented programming.

Figure 1:
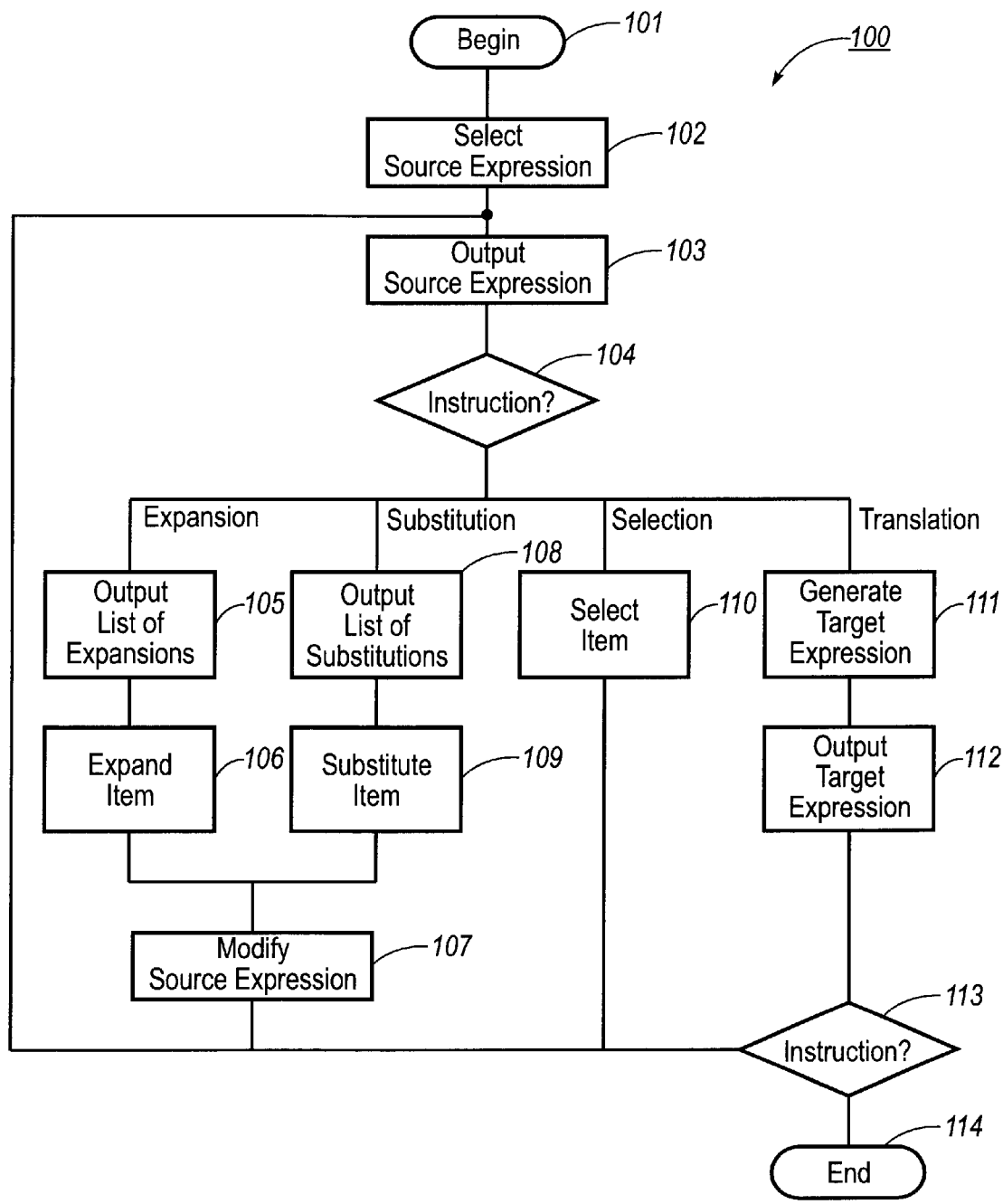
FIG. 1 illustrates a flow chart of the method according to the preferred embodiment of the present invention.

FIG. 1 illustrates a flow chart of the method according to the preferred embodiment of the present invention. The method may be performed in a variety of computer systems 200 including the selection of computer systems 310, 320, 330 and 340 shown in FIG. 3.

The translation process begins at step 101. In step 102, a source. expression on which the translation process is to be based is selected. As mentioned above, a list of possible source expressions is output, i. e. displayed, to a user according to a predetermined thematic hierarchy, or, alternatively, the user may provide a key word, and the list of source expressions is generated with respect to the key word. The thematic hierarchy may be visualized in a tree-like structure, and the list of stored expressions may be displayed in a pop-up window or in a particular section of the display as described above.

In step 103, the selected'source expression is output to the user by means of visual or audio output, or both. In step 104, an instruction of the user, that indicates a desired function, is received.

In case of an item selection, the particular item within the source expression is selected. The user may select an item using a pointing device for moving a cursor and clicking on the item. Alternative navigation and selection means responsive, for example, to the user's voice may be employed. Although the source expression has not been changed yet, it is output again in step 103 in order to indicate selection of the item.

In case of an expansion, a list of expansions that are possible for the selected item is output in step 105. In response to a selection of the user, the selected item is expanded in step 106, and the interlingual structure and the source expression are modified in step 107. Alternatively, in case of a substitution, a list of substitutions that are possible for the selected item is displayed. In response to receiving a selection of the user, the selected item is substituted in step 109, the interlingual structure and the source expression are modified in step 107. The modified source expression is output in step 103.

In case of a translation, the initial source expression or a modified source expression at any point of the process may be translated into a target language in step 111; a target language may be selected in case that the target language has not been preselected at the beginning of the process. Further, the target expression in the target language is generated based on the interlingual structure. In step 112, the target expression is output, i. e. displayed. In response to receiving a continue instruction, step 113, the process may perform a further iteration or end at step 114.

It is an important principle of the present invention that an interlingual structure is provided for every source expression, such that each source expression may be modified using substitution and expansion, and a target expression may be generated for each source expression at any point in the process.

The description of the method according to the preferred embodiment of the present invention is followed by a detailed description of an illustrative example with reference to FIGS. 5 to 12.

Turning to FIGS. 5 to 12, the translation process will be described with reference to a particular example of a number of possible courses of translation. The following notation is used for the example: word (bold) indicates a word for which substitution is possible at this particular point in the process, i. e. a paradigmatic choice; word (italics) indicates a word for which an expansion not already given in the source sentence is possible, i. e. a syntagmatic choice; and word (underlined) indicates that the user has selected this word to have a list of choices output.

For each step numbered (1) to (8), the source sentence in the source language, i. e. English in the example, is shown as displayed to the user; next a corresponding interlingual structure labelled in English for convenience is shown; and target sentences in a first and second target language, here French and German, are shown, that may be output, i. e. displayed, at will.

(1) The user has selected an initial source sentence through the thematic hierarchy. The sentence belongs to the topic "hotel". Furthermore, the user has selected the word "order". The root node of the interlingual structure is labelled "iwl" for "I would like".

First source expression in source language:
I would like to order a *meal*
First interlingual structure 501 illustrated in FIG. 5:
iwl(arg2: guest-order(arg2: meal(det: a)))
First target expression in first target language:
Je voudrais commander un repas
First target expression in second target language:
Ich möchte ein Essen bestellen
(2) After the process has offered a list of possible substitutions for the word "order", the user has selected the word "reserve", and the process perform a default expansion for the word "reserve".
Second source expression:
I would like to *reserve* a table
Second interlingual structure 502 illustrated in FIG. 6:
iwl(arg2: guest-reserve(arg2: guest-table(det: a)))
Second target expression in first target language:
Je voudrais réserver une table
Second target expression in second target language:
Ich möchte einen Tisch reservieren
(3) The user has selected the word "table". The process has offered a list of possible substitutions for the word "table", the user has subsequently selected the word "room" from the list of possible substitutions.
Third source expression:
I would like to *reserve* a room
Third interlingual structure 503 illustrated in FIG. 7:
iwl(arg2: guest-reserve(arg2: hotel-room(det: a)))
Third target expression in first target language:
Je voudrais réserver une chambre
Third target expression in second target language:
Ich möchte ein Zimmer reservieren
(4) The user has selected the word "reserve". The process offers a list of possible expansions, an the user has subsequently selected a "distal-time" expansion. The system has performed a default expansion, and the user has select the word "tomorrow".

Fourth source expression:

I would like to reserve a room for tomorrow

Figure 8:
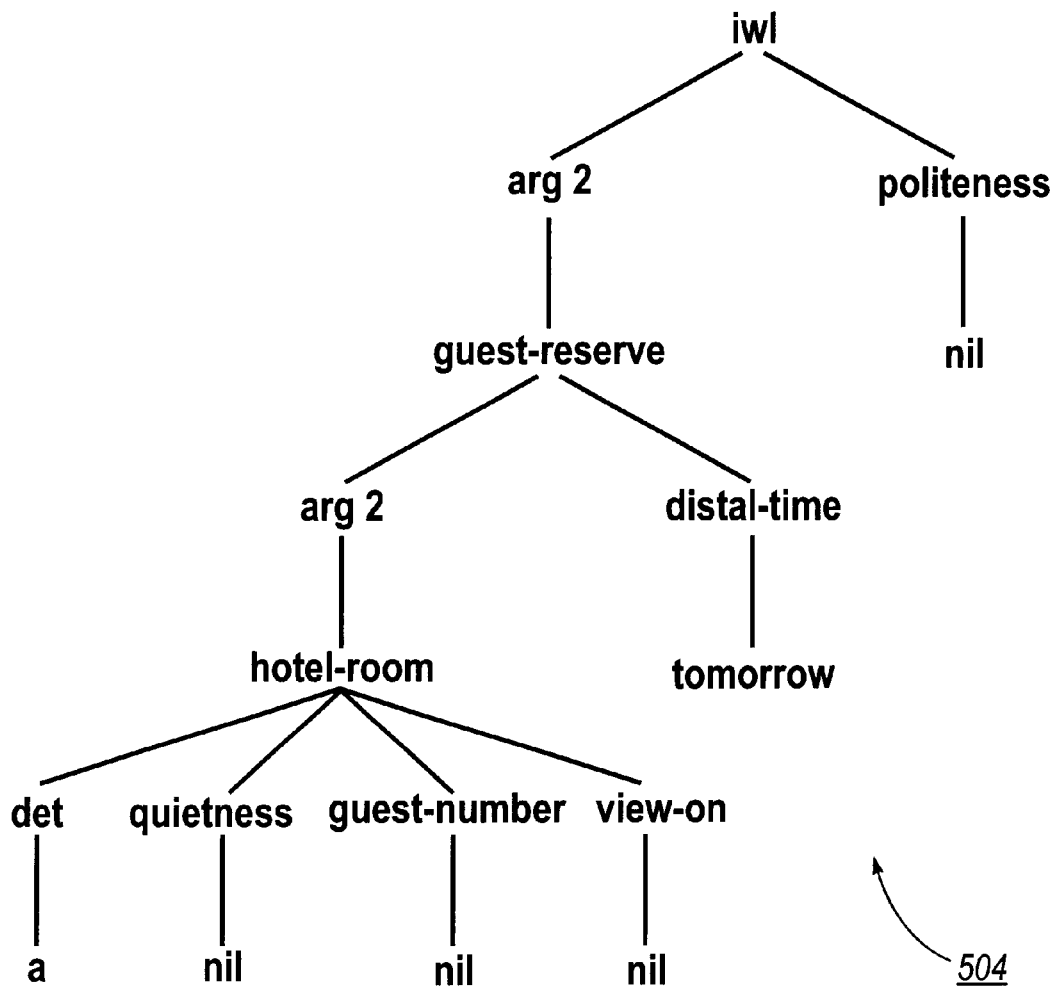

Fourth interlingual structure 504 illustrated in FIG. 8:

iwl(arg2: guest-reserve(arg2: hotel-room(det: a), distal-time: tomorrow))

Fourth target expression in first target language:

Je voudrais réserver une chambre pour demain

Fourth target expression in second target language:

Ich möchte für morgen ein Zimmer reservieren (5) After the process has offered a list of possible substitutions for the word "tomorrow", the user selects the word "tonight" and subsequently selects the word "a".

Fifth source expression:

I would like to reserve a room for tonight

Figure 9:
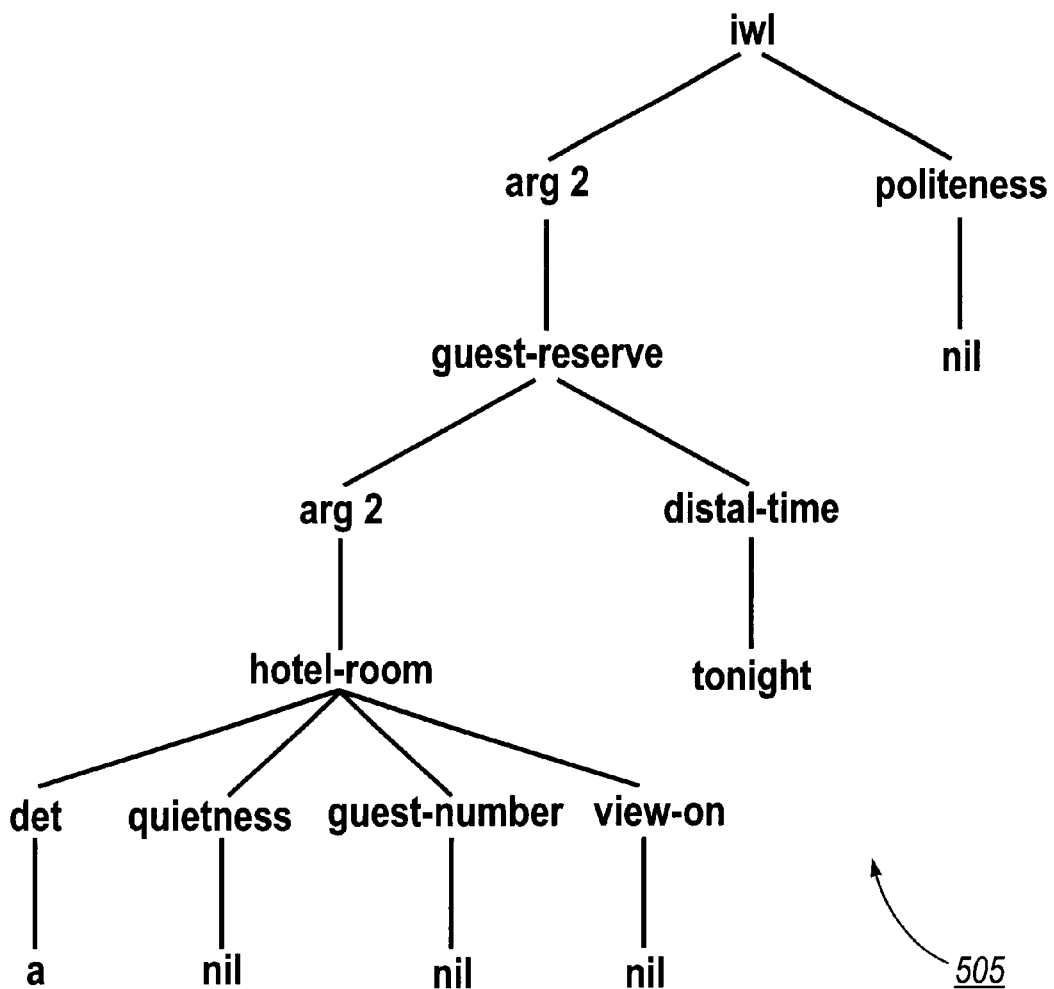

Fifth interlingual structure 505 illustrated in FIG. 9:

iwl(arg2: guest-reserve(arg2: hotel-room(det: a), distal-time: tonight))

Fifth target expression in first target language:

Je voudrais réserver une chambre pour ce soir

Fifth target expression in second target language:

Ich möchte für heute abend ein Zimmer reservieren (6) After the system has offered a list of possible substitutions for the word "a", the user selects the word "two" from the list of possible expansions and subsequently selects the word "rooms".

Sixth source expression:

I would like to reserve two rooms for tonight

Figure 10:
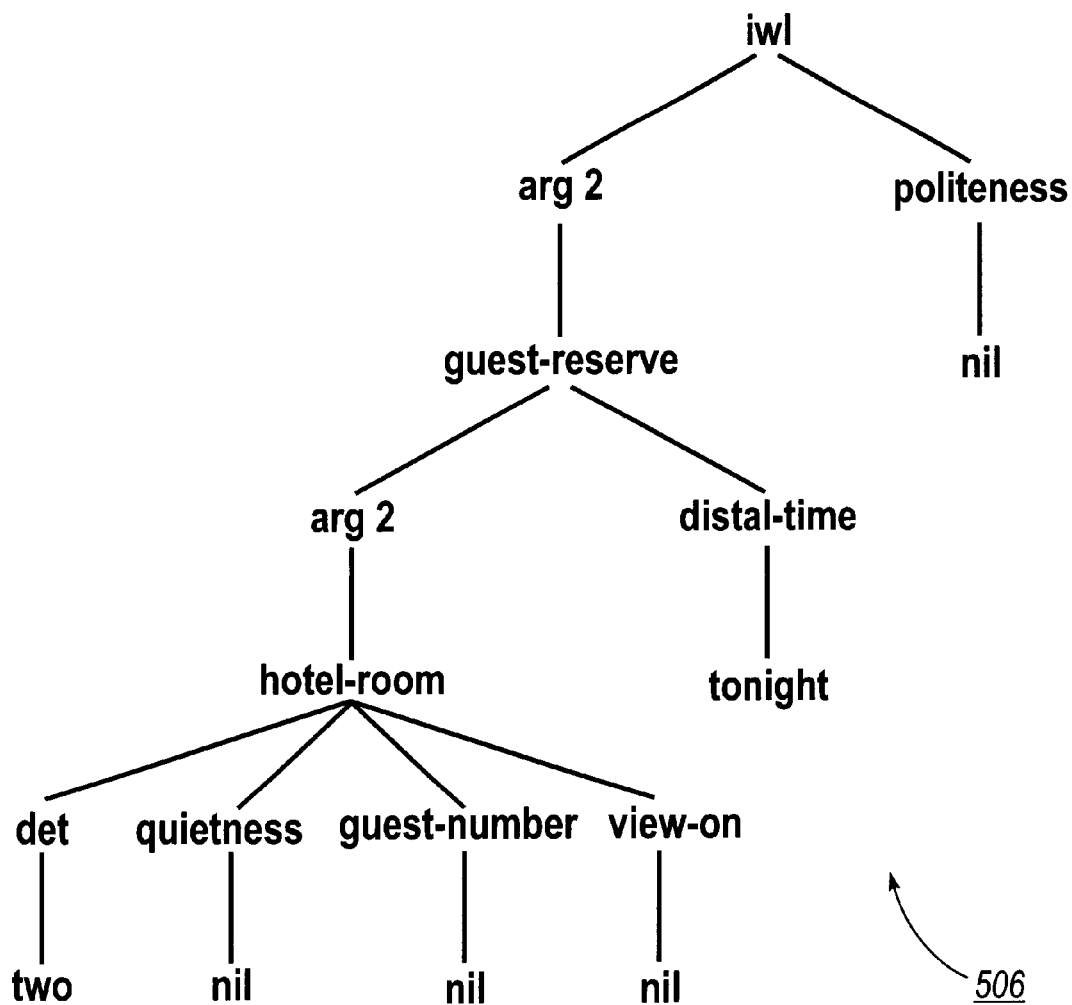

Sixth interlingual structure 506 illustrated in FIG. 10:

iwl(arg2: guest-reserve(arg2: hotel-room(det: two), distal-time: tonight))

Sixth target expression in first target language:

Je voudrais réserver deux chambres pour ce soir

Sixth target expression in second target language:

Ich möchte für heute abend zwei Zimmer reservieren (7) After the process has offered a list of possible expansions, the user selects a "quietness"-expansion and subsequently selects the wording "would like".

Seventh source expression:

I would like to reserve two quiet rooms for tonight

Figure 11:
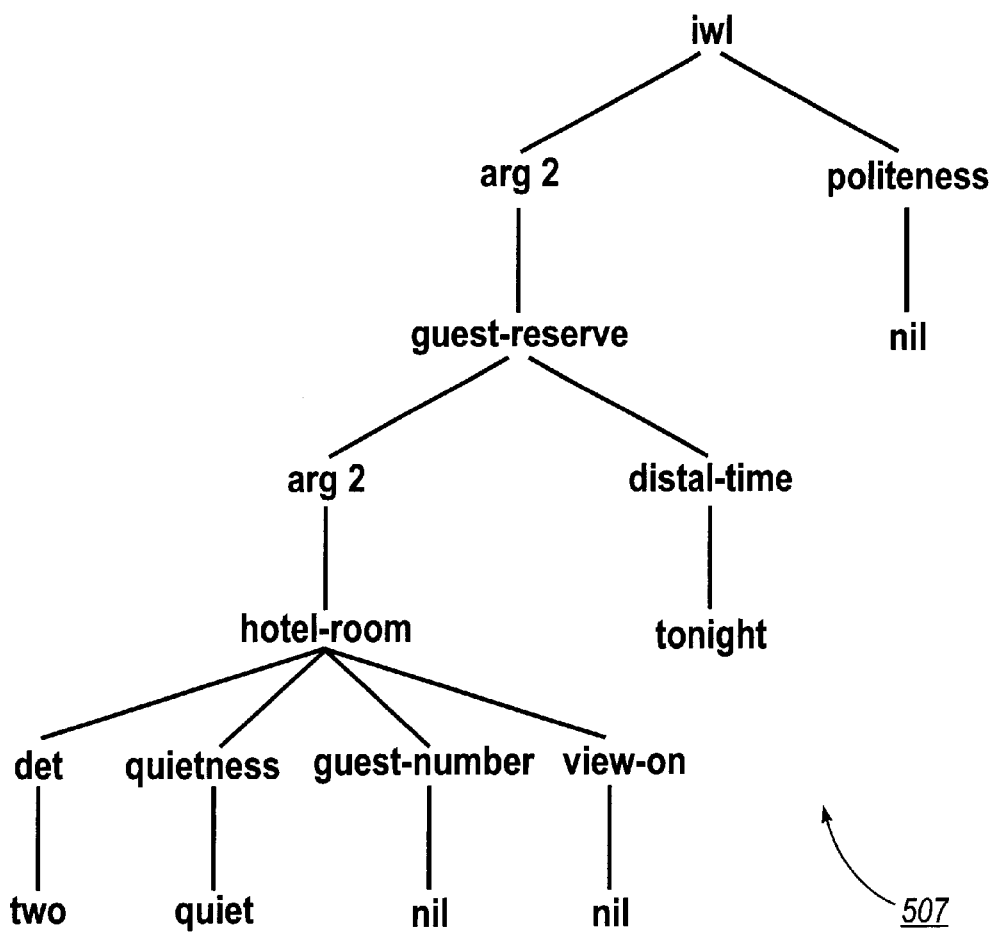

Seventh interlingual structure 507 illustrated in FIG. 11:

iwl(arg2: guest-reserve(arg2: hotel-room(det: two, quietness: quiet), distal-time: tonight))

Seventh target expression in first target language:

Je voudrais réserver deux chambres tranquilles pour ce soir

Seventh target expression in second target language:

Ich möchte für heute abend zwei ruhige Zimmer reservieren (8) After the process has offered a list of possible expansions, the user selects a "politeness"-expansion for the selected wording "would like".

Eighth source expression:

I would like to reserve two quiet rooms for tonight, please

Figure 12:
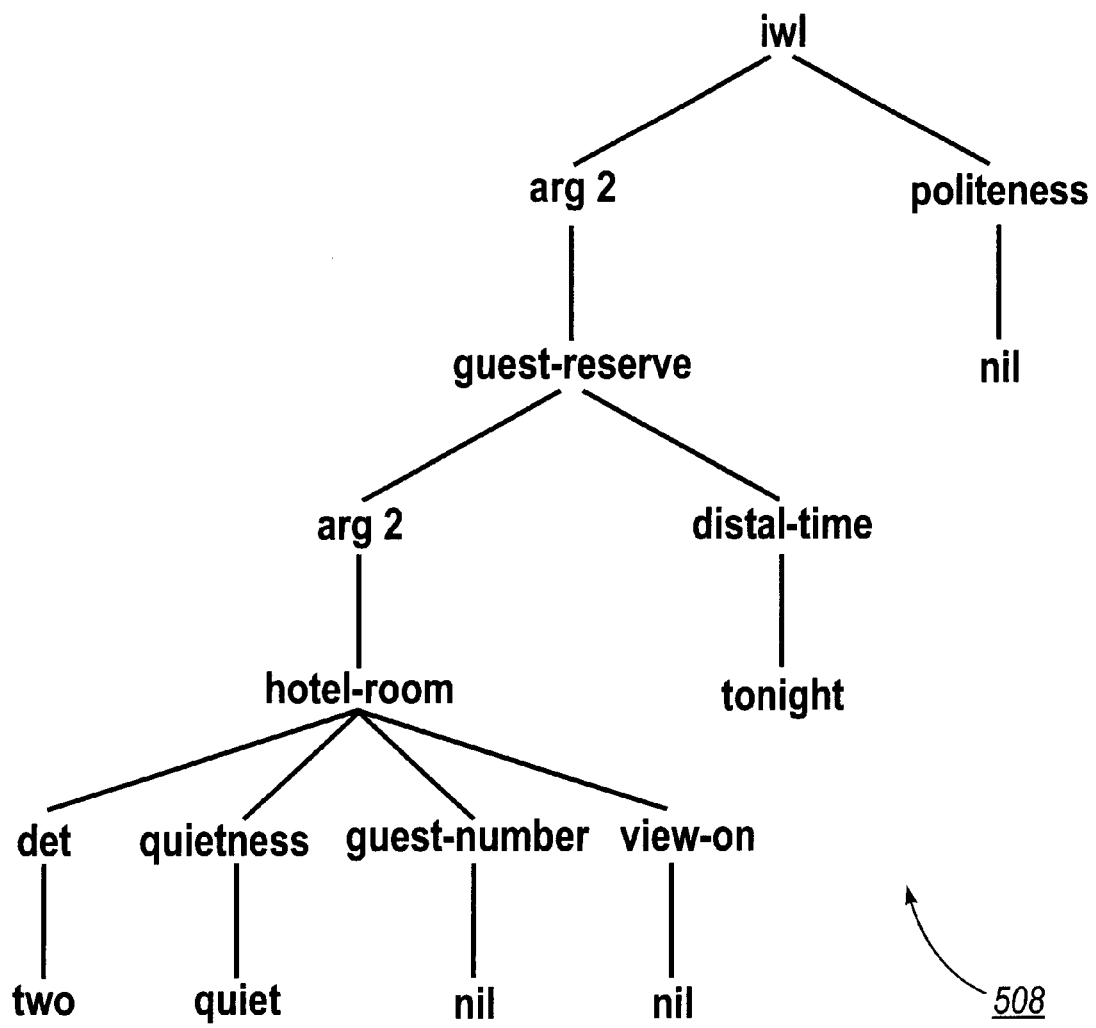

Eighth interlingual structure 508 illustrated in FIG. 12:

iwl(arg2: guest-reserve(arg2: hotel-room(det: two, quietness: quiet), distal-time: tonight), politeness: polite)

Eighth target expression in first target language:

S'il vous plait, je voudrais réserver deux chambres tranquilles pour ce soir

Eighth target expression in second target language:

Ich möchte bitte für heute abend zwei ruhige Zimmer reservieren

The example illustrates the principle of the present invention. Starting from an initial source sentence, a limited modification of the source sentence is performed durirıg each iteration, that is unambiguously reflected in the multilingual structure. Consequently, a valid target sentence in any available target language may be generated at any point in the process.

As those skilled in the art will appreciate, other various modifications, extensions, and changes to the foregoing disclosed embodiments of the present invention are contemplated to be within the scope and spirit of the present invention as defined in the appended claims.

What is claimed is:

1. An interactive method of generating an expression in a target language, said method comprising:

providing a source expression in a source language, said source expression comprising at least one item and having a corresponding interlingual representation;

outputting said source expression to a user;

in response to receiving a transformation instruction from said user;

transforming said source expression in accordance with said transformation instruction; and outputting said transformed source expression to said user, wherein said user can choose to modify said transformed source expression;

generating a corresponding interlingual representation of said transformed source expression;

generating, from said corresponding interlingual representation of said transformed source expression, a target expression in said target interlingual; and outputting said target expression.

2. The method as claimed in claim 1, further comprising:

in response to receiving a selection instruction from said user, selecting an item in said source expression.

3. The method as claimed in claim 2 wherein said step of transforming comprises one of:

substituting said selected item with a substitution; and expanding said selected item with an expansion.

4. The method as claimed in claim 3, further comprising:

providing a list of one of substitutions and expansions; and in response to receiving a list selection from said user, selecting said one of substitution and expansion from said list.

5. The method as claimed in claim 1 wherein said steps of outputting an expression comprises one of displaying the expression and reading the expression.

6. The method as claimed in claim 1, further comprising:

providing a plurality of languages; and in response to receiving a language selection from said user, selecting said target language from said plurality of languages.

7. The method as claimed in claim 1, further comprising:

providing a plurality of source expressions in said source language.

8. The method as claimed in claim 7, further comprising:

in response to receiving a key item from said user, generating, from said plurality of source expressions, a list of source expressions related to said key item;

outputting said list of source expressions; and in response to receiving an expression selection from said user, selecting, from said list of source expressions, said source expression to be provided.

9. The method as claimed in claim 7, further comprising:

arranging said plurality of source expressions into a thematic hierarchy;

outputting said plurality of source expressions in accordance with said thematic hierarchy; and in response to receiving an expression selection from said user, selecting, from said plurality of source expressions, said source expression to be provided.

10. The method as claimed in claim 1, further comprising:

associating at least one instruction with an iconic representation; and displaying said iconic representation.

11. A system for interactively generating an expression in a target language, said system comprising:

means for providing a source expression in a source language, said source expression comprising at least one item and having a corresponding interlingual representation;

means for outputting said source expression to a user;

means for, in response to receiving a transformation instruction from said user;

transforming said source expression in accordance with said transformation instruction, and outputting said transformed source expression to said user, wherein said user can choose to modify said transformed source expression;

means for generating a corresponding interlingual representation of said transformed source expression;

means for generating, from said corresponding interlingual representation of said transformed source expression, a target expression in said target language; and means for outputting said target expression.

12. The system as claimed in claim 11, further comprising:

means for, in response to receiving a selection instruction from said user, selecting an item in said source expression.

13. The system as claimed in claim 12 wherein said item is selected in response to said user clicking on said item.

14. The system as claimed in claim 13 wherein said means for transforming comprises one of:

means for substituting said selected item with a substitution; and means for expanding said selected item with an expansion.

15. The system as claimed in claim 14, further comprising:

means for providing a list of one of substitutions and expansions; and means for, in response to receiving a list selection from said user, selecting said one of substitution and expansion from said list.

16. The system as claimed in claim 11, further comprising:

means for, in response to receiving a repetition instruction from said user, causing said means for transforming and outputting said transformed source expression to repeat said transforming and outputting, respectively.

17. The system as claimed in claim 11 wherein said means for outputting an expression comprises one of means for displaying the expression and means for reading the expression.

18. The system as claimed in claim 11, further comprising:

means for providing a plurality of languages; and means for, in response to receiving a language selection from said user, selecting said target language from said plurality of languages.

19. The system as claimed in claim 11, further comprising: means for providing a plurality of source expressions in said source language.

20. The system as claimed in claim 19, further comprising:

means for, in response to receiving a key item from said user, generating, from said plurality of source expressions, a list of source expressions related to said key item;

means for outputting said list of source expressions; and means for, in response to receiving an expression selection from said user, selecting, from said list of source expressions, said source expression to be provided.

21. The system as claimed in claim 19, further comprising:

means for arranging said plurality of source expressions into a thematic hierarchy;

means for outputting said plurality of source expressions in accordance with said thematic hierarchy; and means for, in response to receiving an expression selection from said user, selecting, from said plurality of source expressions, said source expression to be provided.

22. The system as claimed in claim 11, further comprising:

means for associating at least one instruction with an iconic representation; and means for displaying said iconic representation.

23. The system as claimed in claim 11 wherein the system is comprised in a pocket-sized hand-held device.

* * * * *